United States Patent [19]

Schell

[11] Patent Number: 5,646,207

[45] Date of Patent: Jul. 8, 1997

[54] AQUEOUS SIZING COMPOSITIONS FOR GLASS FIBERS PROVIDING IMPROVED WHITENESS IN GLASS FIBER REINFORCED PLASTICS

[75] Inventor: Philip L. Schell, Assen, Netherlands

[73] Assignee: PPG Industries, Inc., Pittsburgh, Pa.

[21] Appl. No.: 388,959

[22] Filed: Feb. 15, 1995

Related U.S. Application Data

[63] Continuation-in-part of Ser. No. 212,539, Mar. 14, 1994, abandoned.

[51] Int. Cl.$^6$ ...................................... C08L 3/00
[52] U.S. Cl. ..................... 524/47; 524/52; 524/104; 524/106; 524/121; 524/122; 524/123; 524/414; 524/418; 524/419; 524/484; 524/486
[58] Field of Search ................ 524/47, 52, 484, 524/486, 104, 106, 121, 122, 123, 414, 418, 419

[56] References Cited

U.S. PATENT DOCUMENTS

| | | | |
|---|---|---|---|
| 3,169,884 | 2/1965 | Marzocchi et al. | 117/126 |
| 3,252,825 | 5/1966 | Marzocchi et al. | 117/126 |
| 3,416,945 | 12/1968 | Zweidler et al. | 117/33.5 |
| 3,416,990 | 12/1968 | Robinson | 161/93 |
| 3,437,550 | 4/1969 | Paul, Jr. | 161/93 |
| 3,483,276 | 12/1969 | Mahlman | 260/897 |
| 3,816,235 | 6/1974 | Lin | 161/175 |
| 3,920,596 | 11/1975 | Furukawa et al. | 260/22 R |
| 3,968,068 | 7/1976 | Haggerty | 260/29.6 RB |
| 3,984,399 | 10/1976 | Weber et al. | 260/240 |
| 4,248,935 | 2/1981 | Temple | 428/391 |
| 4,295,871 | 10/1981 | Droux et al. | 65/3.41 |
| 4,341,677 | 7/1982 | Tamosauskas | 523/421 |
| 4,457,970 | 7/1984 | Das et al. | 428/290 |
| 4,483,948 | 11/1984 | Tamosauskas | 523/205 |
| 4,637,956 | 1/1987 | Das et al. | 428/391 |
| 4,728,573 | 3/1988 | Temple | 428/378 |
| 4,898,616 | 2/1990 | Hyche et al. | 106/271 |
| 4,960,644 | 10/1990 | Hyche et al. | 428/407 |
| 4,975,120 | 12/1990 | Hyche et al. | 106/271 |
| 5,007,961 | 4/1991 | Hyche et al. | 106/18 |
| 5,024,890 | 6/1991 | Pollet et al. | 428/372 |
| 5,096,493 | 3/1992 | Hyche et al. | 106/271 |

(List continued on next page.)

FOREIGN PATENT DOCUMENTS

| | | |
|---|---|---|
| 0197351 | 9/1989 | European Pat. Off. . |
| 0356655 | 3/1990 | European Pat. Off. . |
| 0381125 A2 | 8/1990 | European Pat. Off. . |
| 0381125 | 8/1990 | European Pat. Off. . |
| 0548930 | 6/1993 | European Pat. Off. . |
| 4129448 A1 | 3/1993 | Germany . |
| 55-149147 | 11/1980 | Japan . |
| 62-10139 | 1/1987 | Japan . |
| 3-262185 | 11/1991 | Japan . |
| 5-65537 | 9/1993 | Japan . |
| 6-4720 | 1/1994 | Japan . |

OTHER PUBLICATIONS

*The Manufacturing Technology of Continuous Glass Fibres*, K. L. Loewenstein, Second Edition, 1983, p. 29.
"Vitamins (Vitamin A)", *Kirk–Othmer Encyclopedia of Chemical Technology*, Second Edition, vol. 21, John Wiley & Sons, Inc., 1970, p. 494.
"Polyethylene and Wax Emulsions", *Chemical Corporation of America*, Technical Bulletin and MSDS and data sheet for Poly Emulsion 43C30.
"Special Effect Pigments", *Coloring of Plastics, Theory and Practice*, Mukhtar Ahmed, pp. 49–71, Van Nostrand Reinhold Co., 1979.
"Brighteners, Fluorescent", *Encyclopedia of Chemical Technology*, vol. 4, John Wiley and Sons, 1978, pp. 213–226.
"Fluorescent Whitening Agents", K. Berger, *Gachter/Muller Plastics Additives*, 3rd edition, pp. 775–789.
"Eastobrite OB–1 Optical Brightener for Plastics", *Polymer Additives and Specialty Monomers*, p. 1.
"Epolene Waxes For the Plastics Industry", *Polymer Additives and Specialty Monomers*, Eastman Chemical Co., pp. 1–3.
"Fluorescent Whitening Agent for Plastics and Coatings", Uvitex® OB, Ciba Geigy.
"Antioxidants for Polyolefins", Ciba–Geigy Technical Bulletin.
"Antioxidants", Chester C. Swasey, *Plastics Additives and Modifiers Handbook*, 1992, Van Nostrand Reinhold, pp. 193–207.
"Antioxidants", Dr. F. Gugumus, *Plastics Additives Handbook, stabilizers, Processing Aids, Plasticizers, Fillers, Reinforcements, Colorants for Thermoplastics*, 3rd edition, edited by R. Gachter and H. Muller, Hanser Publishers, pp. 1–13, 38–49, 96–99.
USSN 08/185,647, filed Jan. 24, 1994 entitled "Chemical Treatment for Reinforcing Materials for Polymeric Matrices and the Treated Reinforcing Materials and Method" by Rajgopal Subramanian et al.
USSN 08/007,407, filed Jan. 22, 1993 entitled "Chemical Treatment for Fibers and Reinforcement for Polymer Matrices Resulting in Good Solvent Resistance", by Robert G. Swisher et al.

*Primary Examiner*—Edward J. Cain
*Attorney, Agent, or Firm*—Linda Pingitore

[57] ABSTRACT

An aqueous sizing composition for glass fibers particularly useful for the reinforcement of thermoplastic or thermosetting matrix polymers contains film-forming material, fluorescent whitening agent, coupling agent, stabilizing agent and lubricant. The film-forming material is selected to be compatible with thermosetting or thermoplastic matrix polymer used in the ultimate forming process. The fluorescent whitening agent is at least dispersed, emulsified or solubilized in water.

The sizing compositions are particularly advantageous for sizing glass fibers to be used in the reinforcement of matrix polymers for forming molded parts. The resultant molded part exhibits exceptional whiteness and and comparable physical properties to materials without the brightening agent.

20 Claims, No Drawings

U.S. PATENT DOCUMENTS

| | | | |
|---|---|---|---|
| 5,130,197 | 7/1992 | Temple | 428/378 |
| 5,130,198 | 7/1992 | Swisher et al. | 428/391 |
| 5,190,579 | 3/1993 | Gose et al. | 106/18 |
| 5,199,098 | 3/1993 | Nolan et al. | 385/128 |
| 5,244,948 | 9/1993 | Mulhaupt et al. | 524/99 |
| 5,247,004 | 9/1993 | Swisher et al. | 524/494 |
| 5,278,210 | 1/1994 | Morimi et al. | 524/100 |
| 5,318,990 | 6/1994 | Strauss | 524/549 |
| 5,334,644 | 8/1994 | Gose et al. | 524/487 |

AQUEOUS SIZING COMPOSITIONS FOR GLASS FIBERS PROVIDING IMPROVED WHITENESS IN GLASS FIBER REINFORCED PLASTICS

CROSS REFERENCE TO RELATED APPLICATIONS

This application is a continuation-in-Part of U.S. Ser. No. 08/212,539 filed Mar. 14, 1994, now abandoned, entitled "Glass Fiber Sizing and Sized Glass Fibers and Polyolefin Reinforcing Articles." This application is related to U.S. Ser. No. 08/388,782 filed even date herewith, entitled "Glass Fiber Sizing, Sized Glass Fibers and Polyolefin Reinforced Articles" which is also a continuation-in-part of U.S. Ser. No. 08/212,539, above.

BACKGROUND OF THE INVENTION

The present invention relates to sizing compositions for glass fibers used to reinforce plastics, sized fibers and plastic articles reinforced with said sized fibers.

Glass fiber reinforced plastics, whether thermoplastic or thermosetting, typically contain impurities which generally cause yellowing. Historically, this discoloration has been counteracted by the addition of a blue pigment or dye to the plastic. As a result of color compensation, the plastic appears whiter, although in fact it is actually grayer because of the loss of lightness due to absorption of light by the pigment or dye. More recently, a better way to counteract the yellow discoloration has been with the aid of fluorescent whitening or brightening agents (FWA) also referred to as optical brighteners. Since the yellow cast is produced by absorption of short wave-length light, with the FWA, the lost light is partially replaced by fluorescence of the brightener, thus producing a complete white without loss of light. The brightener typically absorbs the invisible ultraviolet portion of the daylight spectrum and converts this energy into the longer wavelength visible portion of the spectrum.

Japanese Kokoku 6[1994]-4720 and 5[1993]65537 exemplify glass fiber reinforced thermoplastic polymers in which a fluorescent whitening agent is added with the binder for the glass fiber. U.S. Pat. No. 4,609,591 discloses a 100 percent solids, nonaqueous sizing composition for glass fibers which contains a whitening agent.

Notwithstanding the advantages of FWA, coloration problems still remain. When blending a FWA into a plastic matrix polymer, in order to prevent discoloration satisfactorily, the FWA must disperse well in the matrix polymer. However, at the low levels in which FWA are typically used, uniform blending of the brightener with the matrix polymer can be difficult to achieve and, moreover, physical properties of the plastic are sometimes detrimentally affected.

There is a need, therefore, for a convenient way to achieve glass fiber reinforced plastics with good physical properties, which do not yellow and are easily and economically processed.

SUMMARY OF THE INVENTION

In accordance with the present invention there is provided an aqueous sizing composition for glass fibers adapted to reinforce thermoplastic or thermosetting matrix polymers. The sizing composition comprises:

(a) a film-forming material compatible with thermosetting or thermoplastic matrix polymers, (b) a fluorescent whitening agent which is at least dispersed, emulsified or solubilized in water, (c) a coupling agent, (d) a stabilizing agent, and (e) lubricant.

Also provided in accordance with the present invention are glass fibers sized with the aforedescribed sizing composition as well as plastic articles reinforced with the sized fibers.

DETAILED DESCRIPTION OF THE INVENTION

The aqueous, glass fiber sizing compositions of the present invention contain as essential components a film-forming material, a fluorescent whitening agent which is at least dispersed, emulsified or solubilized in water, a coupling agent, a stabilizing agent and lubricant. As used herein, the terms "size" or "sizing" refer to an aqueous composition applied to glass fibers immediately after formation. The claimed aqueous glass fiber sizing compositions are particularly advantageous in that the sized glass fibers are compatible with thermoplastic as well as thermosetting matrix polymers and yield reinforced plastic composites which exhibit exceptional whiteness without loss in physical or mechanical properties. Moreover, since the fluorescent whitening agent is in the form of an aqueous dispersion, emulsion or solution, handling and processing are facilitated and the amount of whitening agent required is reduced.

The fluorescent whitening agents suitable for use herein absorb the invisible ultraviolet portion of the daylight spectrum between about 300 and 400 nanometers and emit this energy as visible radiation in the longer wavelength portion of the spectrum, between about 400 and 500 nanometers. The fluorescent whitening agent, therefore, functions by replacing the light lost as a result of absorption of short wavelength light. Fluorescent whitening agents, therefore, generally should be optically colorless on the substrate and should not absorb in the visible part of the spectrum. There are a considerable number of different types of fluorescent whitening agents which are suitable for use herein so long as the FWA is adapted to be at least dispersed, emulsified or solubilized in water.

Representative materials can be generally classified as follows:

Stilbene derivatives which include:
  4,4'-Bis(triazin-2-yl amino)stilbene-2,2'-disulfonic acids;
  mono(azol-2-yl)stilbenes; and
  bis(azol-2-yl)stilbenes Styryl derivatives of benzene and biphenyl which include:
  1,4-Bis(styryl)benzenes and
  4,4'-Bis(styryl)biphenyls
  1,3-diphenyl-2-pyrazolines Bis(benzazol-2-yl)derivatives which include:
  bis(benzoxazol-2-yl) derivatives
  Bis(benzimidazol-2-yl) derivatives
  2-(Benzofuran-2-yl)benzimidazoles
  coumarins
  carbostyrils
  naphthalimides
  derivatives of disbenzothiophene-5,5-dioxide
  pyrene derivatives
  pyridotriazoles The aforelisted categories of fluorescent whitening agents are well-known materials prepared by chemical reactions well understood by those skilled in the art. A detailed discussion of the manner of preparation of the aforelisted fluorescent agents can be found in the *Encyclopedia of Chemical Technology*, Volume 4, John Wiley and Sons, 1978, pages 214–220, which is incorporated by reference herein. The preferred fluorescent whitening agents for use in the present invention are Bis(benzazol-2-yl) derivatives which are typically referred to as Bis(benzoxazol-2-yl) derivatives, and Styryl derivatives of benzene and biphenyl which include 1,4-Bis(styryl)benzenes and 4,4'Bis(styryl) biphenyls. These materials can be represented by the structural formulas which are set out below.

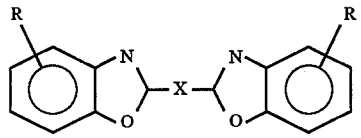

FORMULA I wherein X is:

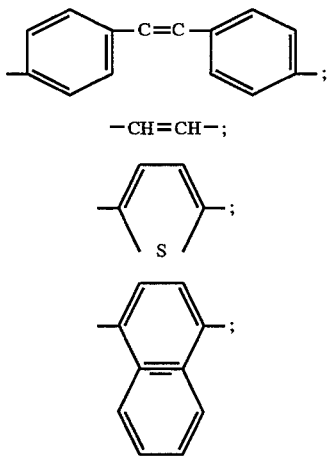

and R is alkyl. Preferably R is lower alkyl of 1 to 6 carbon atoms, more preferably 1 to 4 carbon atoms.

FORMULA II

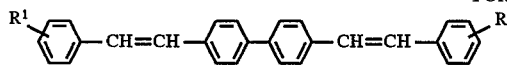

wherein $R^1$ is ortho —$OCH_3$

Examples of commercially available materials representative of the aforesaid structural formulas include EASTOBRITE OB-1 brightener which is a bisbenzoxazole commercially available from Eastman Chemical Company of Kingsport, Tenn. The complete chemical name for EASTOBRITE OB-1 reported by the supplier is 2,2'-(1,2-ethenediyldi-4,1-phenylene)bisbenzoxazole having CAS No. 1533-45-5. The supplier reports this material to be a crystalline solid, yellow in appearance having a calculated molecular weight of 414.4 and a melting point (DTA) 359° C. A similar type of bisbenzoxazole also commercially available from Eastman Chemical is EASTOBRITE OB-3. Also representative of the above structural formulas are the commercially available materials from Ciba Geigy Corporation sold under the trademark UVITEX. UVITEX SD brightener is a bis(styryl) biphenyl. UVITEX EDS and UVITEX ERN brighteners are both bisbenzoxazoles. UVITEX OB brightener corresponds to structural Formula I with X being thiophene and R being tertiary butyl. UVITEX FP brightener corresponds to structural Formula II with $R^1$ being o-$OCH_3$ (an ortho methoxy group). UVITEX EBF brightener corresponds to structural Formula I with X being thiophene and R being hydrogen while UVITEX ERN brightener also corresponds to structural Formula I with X being —CH =CH— and R being methyl, $CH_3$. UVITEX TINOPAL SFP is an aqueous solution of optical brightener also suitable for use herein.

The fluorescent whitening agent used in the present invention is at least dispersed, emulsified or solubilized in water. The commercially available materials sold under the trademark AQUASTAB by Eastman Chemical Company above are aqueous emulsions of the EASTOBRITE family of fluorescent whitening agents also from Eastman Chemical Co.

The fluorescent whitening agent of the present invention is emulsified in water, preferably deionized water, to produce a stable dispersion having a particle size range of from about 1 to about 10 microns. By "stable" is meant that the emulsion does not tend to settle or sediment upon standing or storage and any minor settling can be easily redispersed with gentle stirring. It should be understood that water miscible or soluble organic solvents can be used in conjunction with water in forming the emulsion. Examples of suitable water miscible or soluble organic solvents well known to those skilled in the art include tetrohydroforan, and the ether solvents sold under the trademark Dowanol by Dow Chemical Company, for example, propylene glycol methyl ether, dipropylene glycol methyl ether and tripropylene glycol methyl ether. Alcohols such as ethanol, methanol and propanol can also be used. The amount of fluorescent whitening agent in the aqueous sizing composition generally ranges from about 0.05 weight percent to about 5 weight percent, preferably about 0.25 weight percent to about 1.5 weight percent, the percentages based on the total solids of the aqueous sizing composition.

The film-forming material compatible with thermosetting or thermoplastic matrix polymers can be selected from among a variety of art recognized materials. Examples of suitable materials include starch and film forming polymers which are thermoplastic or thermosetting including polyurethanes, polyepoxides, polyolefins, acrylic polymers, polyesters, vinyl polymers and mixtures thereof. By "film-forming" is meant that upon removal of the water and/or other volatile materials present in the aqueous sizing composition, the film-forming material is capable of coalescing to form a film on the surface of the glass fibers to which it is applied.

Useful starches are well known to those skilled in the art and include those derived from corn, potatoes, tapioca or rice. Starches can have low or high amylose content and can be modified in various ways including acetylation, chlorination, acid hydrolysis, derivatizing agents, crosslinking agents or enzymatic action. Exemplary of useful commercially available starches include KOLLOTEX 1250 (low amylose chemically modified potato starch commercially available from AVEBE of the Netherlands); HYLON and NABOND (high amylose starches commercially available from National Starch and Chemical Corp. of Bridgewater, N.J.); and National 1554, a low amylose crosslinked potato starch also commercially available from National Starch and Chemical Corp.

Synthesis of the film-forming polymers mentioned above are well known to those skilled in the art and will not be discussed here. A comprehensive discussion can be found in "The Chemistry of Organic Film Formers", by D. H. Solomon, Robert E. Krieger Publishing Company, 1977. By "matrix compatible" is meant that the film forming material does not degrade or reduce the mechanical properties of the fiber reinforced polymer matrix when compared with the mechanical properties obtained from the fiber reinforced polymer matrix having no film-forming material present in the sizing composition for the glass fiber. Coalescence of the film can occur by removal of volatiles upon drying in conjunction with curing of any film-forming polymers present with suitable cross-linking agents or ionizing radiation or combinations thereof for thermosetting polymers. In film-forming polymers which are thermoplastic in nature film coalesence occurs simply by volatilization of the carrier and drying. The film-former is generally selected to give optimum properties in the final cured matrix material. As mentioned above, the plastic matrix polymer can be thermoplastic or thermosetting, depending upon the end use. Examples of thermosetting plastic matrix polymers include alkyds, aminos (melamines and ureas), allylics such as diallyl phthalate and diallyl isophthalate, polyepoxides, phenolics, polybutadienes, polyesters and silicones. Blends of one or more of these thermosetting materials can also be used. Thermoplastic matrix polymers differ from thermosetting polymers in that thermoplastics do not cure or set under heat as do thermosets. They merely soften, when heated to a flowable state, and can be easily processed by applying pressure such as injection molding, extruding and thermoforming. Thermoplastics can be remelted and rehardened many times. Examples of suitable thermoplastic matrix polymers include ABS plastics (acrylonitrile-butadiene-styrene); acetals; acrylics such as polymethyl methacrylate, cellulosics such as cellulose acetate butyrate, cellulose acetate and ethyl cellulose; fluorocarbons; polyamides such as nylons; polycarbonates; polyesters such as polyethylene terephthalate and polybutylene terephthalate; polyolefins such as polyethylene and polypropylene and mixtures thereof; vinyls such as polyvinyl chloride, polystyrenes and polysulfones. Blends of two or more of these thermoplastic materials can also be used.

As was mentioned above, certain film formers are better suited to certain matrix materials. Polyurethane film-forming polymers are especially useful for polyamide matrix polymers like nylon; polyepoxides in combination with vinyls such as polyvinyl alcohol are especially useful when the matrix polymer is a polyacetal; and mixtures of polyurethane and polyepoxide film-forming polymers are particularly useful when the matrix polymer is polybutylene terephthalate. Polybutadiene polymers such as styrene-butadiene copolymers are useful for polycarbonate matrix polymers.

Representative examples of commercially available film-forming polymers include WITCO 290 H from Witco Chemical Company and Ruco 2011L from Ruco Chemical Company, both polyurethane film-forming polymers; CMD 35201 from Shell Chemical Company and Neoxil 8294 from DSM Italia, both polyepoxide film-formers having epoxy equivalent weights between about 500 and 700; and 76 RES 4470 and 76 RES 5550 from UNOCAL, both styrene-butadiene latex polymers.

The preferred film-forming material for use in the present invention is a polyolefin compatible film-forming polymer which is preferably an aqueous emulsion of a chemically modified polyolefin. The term "chemically modified polyolefin" refers to carboxylic acid or anhydride modified polyolefins which are either in amorphous or crystalline form and produced for example by the method described in U.S. Pat. No. 3,416,990, U.S. Pat. No. 3,437,550 and U.S. Pat. No. 3,483,276. Further discussion concerning the modification and emulsification of such polyolefins may be found in U.S. Pat. No. 5,130,197. An example of a crystalline carboxylated polyolefin polymer is that which is commercially available from Hercules, Inc. under the tradename HERCOPRIME® G type resin. An example of an amorphous carboxylated polypropylene polymer is that which is commercially available from Eastman Chemical Company under the trademark EPOLENE® E-43. Also suitable for use herein is an aqueous emulsion of the EPOLENE E-43 type material commercially available from Byk-Cera under the trademark designation AQUACER 841 emulsion. The AQUACER 841 type of material is a preferred polyolefin compatible film-former for use in the present invention. CHEMCOR 43C30 amorphous carboxylated polypropylene aqueous emulsion commercially available from Chemical Corporation of America is another preferred polyolefin compatible film-former for use in the present invention. Another commercially available aqueous emulsion of chemically modified polyolefin is an amorphous carboxylated polypropylene sold under the trademark PROTOLUBE RL-5440 emulsion by National Starch, Procter Division.

An aqueous emulsion of the polyolefin compatible film-former can be prepared by methods well known to those skilled in the art using any of a variety of art-recognized surfactants for the emulsification of polyolefins. Examples of suitable surfactants include phenoxy poly(ethelene-oxy) ethanol; phenoxy (ethyleneoxy) ethanol; octylphenoxy poly (ethyleneoxy) ethanol; nonylphenoxy poly(ethyleneoxy) ethanol as well as other ethoxolated alkyl phenols. An example of a commercially available ethoxylated octylphenoxy ethanol is IGEPAL CA-630 emulsifier commercially available from GAF Corporation of Wayne, N.J. Also suitable as surfactants are polyoxyalkylene block copolymers such as polyoxypropylene-polyoxyethylene copolymer commercially available as PLURONIC™F-108 from BASF Corporation in Parsippany, N.J. The amount of surfactant used to prepare the emulsion can vary but generally ranges from about 5 weight percent to about 25 weight percent of the emulsion, the percentages based on the total solids of the emulsion.

Generally, the emulsion is prepared by melting the polyolefin, preferably carboxylic acid modified, at a temperature in the range of from about 105° C. to about 185° C. preferably about 170° C. to about 175° C. under pressure generally ranging from about 5 to about 10 atmospheres, preferably about 6.8 to 8.2 atmospheres, in the presence of the surfactant and also nitrogenous base which is preferably a secondary or tertiary amine, for example diethyl ethanolamine. The base neutralizes the acid modified polyolefin after which the surfactant acts to emulsify the neutralized polymer. After reaction is complete, water is added to cool the mixture. Typically, the emulsion is prepared at a total solids of about 20 to about 40 percent.

The amount of the film-forming material in the aqueous sizing composition can range from about 50 weight percent to about 98 weight percent preferably from about 70 weight percent to about 90 weight percent, the percentages based on the total solids of the sizing composition.

The coupling agent facilitates adhesion of the organically based sizing composition to the polar glass fiber. Examples of suitable coupling agents include functional organo silanes, transition metal coupling agents, amino containing werner coupling agents and mixtures thereof. Each metal or silicon atom has attached to it one or more hydrolyzable groups which can react with the glass surface resulting in removal of hydroxyl groups, and one or more groups which, for thermosetting film forming polymers at least, can co-react with the polymer during film-formation. A chemical bridge is thus formed between glass surface and polymer. Examples of hydrolyzable groups include:

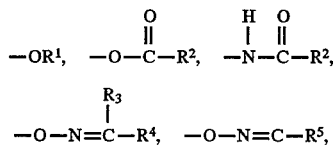

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of groups reactive with film-forming materials include epoxy, glycidoxy, mercapto, cyano, allyl, urethano, halo, isocyanato, ureido, imidazolinyl, vinyl, acrylato, methacrylato, amino or polyamino groups.

Examples of such functional organo silane coupling agents include 3-aminopropyldimethylethoxysilane, gamma-aminopropyltriethoxysilane, gamma-aminopropyltrimethoxysilane, beta-aminoethyltriethoxysilane, N-beta-aminoethylamino-propyltrimethoxysilane, gamma-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltriemethoxysilane, and chloropropyltriethoxysilane.

Non-limiting examples of commercially available functional organo silane coupling agents include epoxy (A-187 gamma-glycidoxypropyltrimethoxysilane), methacrylate (A-174 gamma-methacryloxypropyltriemethoxysilane) and amino (A-1100 gamma-aminopropyltriethoxysilane) silane coupling agents, each of which is commercially available from Osi Specialties, Tarrytown, N.Y.

Transition metal coupling agents include chrome, titanium and zirconium coupling agents such as for example the titanate complexes commercially available from Kenrich Petrochemical Company under the registered trademark Ken-React, for example, Ken-React KR-44, KR-34 and KR-38; the chrome complex commercially available from E. I. DuPont de Nemours under the trademark Volan; and the zirconate coupling agents also commercially available from Kenrich Petrochemical Company under the Ken-React trademark, for example, Ken-React NZ-97 and LZ-38. The amino-containing werner type coupling agents are complex compounds in which a trivalient nuclear atom such as chromium is coordinated with an organic acid having amino functionality. Other metal chelate and coordinate type coupling agents known to those skilled in the art can be used herein.

Amino-functional organosilane coupling agents are preferred for use herein and can be hydrolyzed to some degree prior to use by reacting the silane in aqueous medium with an effective amount of a suitable acid such as acetic acid.

The coupling agent is generally present in the aqueous sizing composition in an amount from about 1 weight percent to about 30 weight percent, preferably from about 2 to about 20 weight percent, more preferably from about 5 to about 18 weight percent, the percentages based on the total solids of the sizing composition.

The stabilizer is a material which is effective against the oxidizing phenomenon. That is, the material is effective to deter oxidation of the matrix polymer which has been described above to which the sized glass fibers are added as reinforcement as well as the coupling agent. The stabilizer is a water dispersible, emulsifiable or soluble material selected from among a variety of materials including phosphites, phosphinates (or termed phosphonites depending upon the valance), hypophosphites, sulfites, bisulfites and mixtures thereof. The stabilizer can be used singly or in admixture with other suitable materials which are dispersible, emulsifiable or soluble in water. Examples of these other type of antioxidants include hindered phenols, diarylamines and thioethers.

More particularly, the stabilizer for use in the present invention can be selected from:

i) phosphinates selected from the group consisting of alkali metal phosphinates, alkaline earth metal phosphinates, ammonium phosphinate, organic phosphinates and mixtures thereof;

ii) phosphonites selected from the group consisting of alkali metal phosphonites, alkaline earth metal phosphonites, ammonium phosphonite, organic phosphonites and mixtures thereof;

iii) phosphites selected from the group consisting of alkali metal phosphites, alkaline earth metal phosphites, ammonium phosphite, organic phosphites and mixtures thereof;

iv) hypophosphites selected from the group consisting of alkali metal hypophosphites, alkaline earth metal hypophosphites, ammonium hypophosphite and mixtures thereof;

v) sulfites selected from the group consisting of alkali metal sulfites, alkaline earth metal sulfites, ammonium sulfite and mixtures thereof;

vi) bisulfites selected from the group consisting of alkali metal bisulfites, alkaline earth metal bisulfites, ammonium bisulfite and mixtures thereof; and vii) mixture of one or more of said stabilizers of i through vi with an antioxidant selected from the group consisting of hindered phenols, diarylamines, thioethers and mixtures thereof.

Sodium, potassium and lanthanum are exemplary of alkali metals and alkaline earth metal, respectively for the above stabilizers.

In one embodiment, an alkali metal phosphinate stabilizer is used which is an alkali metal phenyl phosphinate, an example of which is sodium benzene phosphinate. This material is used in amounts as generally disclosed hereinafter, although greater amounts can be used if additional benefits are required. An example of a commercially available sodium benzene phosphinate is that available from Stauffer Chemical Company having the formula $C_6H_6O_2PNa$ with a formula weight of 164.

Examples of organic phosphite antioxidant-type stabilizers include organic diisodecyl pentaerythritol phosphite, trialkyl phosphites, like triisodecyl phosphite, tristearyl phosphite, trimethyl phosphite, tris-(2,4-di-tert-butylphenol) phosphite, tris-(2,4-dimethylphenol) phosphite, alkylphenyl phosphites like isooctyl diphenyl phosphite, diisooctyl phenyl phosphite, hindered type organic phosphites like phosphorous acid cyclic neopentanetetrayl dioctadecyl ester, phosphorous acid and phosphorous cyclic neopentanetetrayl bis (alkylbutylphenyl) ester, and others as described in U.S. Pat. No. 5,278,210 hereby incorporated by reference. A suitable example is Irgafos 168 which is tetrakis (2,4-di-tert-butylphenyl)4,4'-biphenylylendiphosphite. An example of an organic phosphinate stabilizer is sodium benzene phosphinate, mentioned above.

The preferred stabilizers are the water soluble inorganic hypophosphites, preferably the alkali earth metal hypophosphites including sodium and potassium hypophosphite. Most preferably sodium hypophosphite is the sole stabilizer present in a preferred amount of from about 2 to about 10 weight percent of the aqueous sizing composition. A suitable sodium hypophosphite is that available from Fisher Scientific Company as solid sodium hypophosphite having the formula $NaH_2PO_2 \cdot H_2O$. This material is water soluble and can be dissolved into the aqueous sizing composition directly or predissolved and then added. Preferably the sodium hypophosphite is predissolved in water and then added to the sizing composition. An effective stabilizing amount of the stabilizer is one which improves the mechanical properties of the glass fiber reinforced thermoplastic polymeric matrix.

The stabilizer is generally present in the claimed sizing composition in an amount ranging from about 1 weight percent to about 25 weight percent, preferably from about 1 weight percent to about 15 weight percent and more preferably from about 2 weight percent to about 10 weight percent, the percentages based on the total solids of the sizing composition. Greater amounts of stabilizer can be used to provide even greater benefits in mechanical properties so long as the amount does not deleteriously affect the overall performance of the size.

As mentioned above, mixtures of these stabilizers are useful. Examples of other antioxidants that can be used in stabilizer combinations with one or more of the phosphites, hypophosphites, phosphinates and bisulfites are the hindered phenols, diarylamines, thioethers and polymers thereof and mixtures thereof which have been mentioned above. Examples of hindered phenols include triethylene glycol bis[3-(3'-TERT-butyl-4'-hydroxy-5'methyl phenyl) propanoate] and octadecyl 3,5-bis(1,1-dimethylethyl)-4-hydroxybenzene propanoate commercially availabe from Ciba-Geigy as IRGANOX 245 and 1076, respectively. An example of a diarylamine includes 4,4'-di-tert-octyl-diphenylamine. Examples of thioethers include di(tridecyl) thiodipropionate with a chemical formula of $S(CH_2CH_2COOC_{13}H_{27})_2$. A suitable commercially available thiodipropionate is that available from W. R. Grace Company from their Evans Chemetics Unit in Waterloo, N.Y., under the product name Evanstab 13. Another example is distearyldithiodipropionate (DSTDP) available from Eastman Chemical Company, Tenn. under the trade designation PA 49M. The amount of the stabilizer mixture is generally in the aforestated range of amounts for the stabilizer.

The lubricant can be any cationic, non-ionic or anionic glass fiber lubricant or mixtures thereof compatible with the other ingredients of the sizing composition which reduces interfilament abrasion between the glass fibers. Suitable lubricants include amine salts of fatty acids, for example fatty acid moieties having 12 to 22 carbon atoms and/or tertiary amines having alkyl groups of 1 to 22 carbon atoms attached to the nitrogen atom; alkyl imidazoline derivatives such as can be formed by the reaction of fatty acids with polyalkylene polyamines; acid solubilized fatty acid amides, for example, saturated or unsaturated fatty acid amides having acid groups of 4 to 24 carbon atoms such as stearic amide, and acid solubilized polyunsaturated fatty acid amides. Also suitable are condensates of a fatty acid and polyethyleneimine and an amide substituted polyethylene imine, such as Emery 6717, a partially amidated polyethyleneimine commercially available from Henkel Corporation of Kankakee, Ill. Also suitable Emery fiber lubricants are the products Emery 6760 and Emery 4046D.

Preferably, the lubricant is a partial ester of a branched carboxylic acid copolymer. The partial ester and its derivatives are polymers with pendant hydrocarbon and ethoxylated ester chains. A commercially available partial ester of a branched carboxylic acid copolymer is that from Akzo Chemie America, of Chicago, under the trade designation Ketjenlube 522 partial ester (also sold as Dapral® GE 202 partial ester). The supplier reports that this material has an average molecular weight of about 20,000, a specific gravity of 1.05 at 25° C., a flash point of 178° C. COC (Cleveland Open Cup) and is a yellowish, viscous liquid with little odor. This polymer has a comb-like structure and the main chain consists of carbon atoms only. The alkyl branches are hydrophobic and the ester and ether groups are hydrophilic. When present, the partial ester is generally used in an amount ranging from about 0.1 weight percent to about 10 weight percent preferably from about 0.1 weight percent to about 5 weight percent, more preferably from about 0.5 weight percent to about 2.0 weight percent, the percentages based on the total solids of the sizing composition. Any of the other suitable lubricants discussed above would be used in corresponding amounts.

The sizing composition of the present invention optionally can contain other ingredients well known to those skilled in the art such as, for example, biocides, anti-foaming agents, plasticizers, humectants, antistatic agents, nucleating agents, flame retardants and ultraviolet light stabilizers.

As was mentioned above, the carrier is preferably water, more preferably deionized water. Generally the water is present in an amount sufficient to give a total solids in the range from about 1 percent to about 30 percent, preferably from about 5 to about 20 percent and more preferably from about 8 to about 15 percent. Water miscible or soluble solvents can be added in conjunction with water along with thixotropic agents to produce foams and gels of the sizing composition. Water and any cosolvents are typically utilized in amounts to provide a viscosity not to exceed about 150 centipoise at 20° C. Usually the viscosity of the aqueous sizing composition ranges from about 1 to about 60 centipoise, preferably about 20 to about 60 centipoise at 20° C. When thixotropic agents are added to produce foams or gels, the viscosity is such that it is appropriate for applying foams or gels to glass fibers. These parameters are well known to those skilled in the art.

The aqueous sizing composition is generally prepared by addition of any of the components described herein concurrently or sequentially. Preferably each of the components is prediluted with water, combined and then further water added to achieve the requisite solids level. Such an approach enhances dispersibility of the materials. In the preferred embodiment, deionized water is added to a main mix tank followed by the addition of acetic acid and then the A-1100 aminofunctional organosilane. Subsequently, the polypropylene emulsion, AQUACER 841 or CHEMCOR 43C30, is added to the main mix tank followed by a solution of sodium hypophosphite in water. Then, the Ketjenlube 522 (or DAPRAL GE 202) lubricant is predissolved in water and added followed by the aqueous dispersion of fluorescent whitening agent which is further prediluted with water prior to addition to the main mix tank. Deionized water is then added to the desired volume.

The aqueous sizing composition can further comprise one or more organic acids in an amount sufficient to provide the sizing composition with a pH of from about 4 to about 6. Suitable acids include mono and polycarboxylic acids and anhydrides thereof where they exist such as acetic acid, formic acid, propionic acid, lactic acid, benzoic acid, acrylic acid and mixtures thereof.

The particular proportions of ingredients selected within the preferred ranges disclosed herein can vary depending upon the specific processing conditions for the glass fibers. For example, not intending to be bound by theory, it has been observed that when the sized glass fibers are dried under more severe conditions, an amount of coupling agent at the higher end of the preferred range is more suitable. Example I herein represents the composition preferred for higher temperature drying of the glass. Example II, on the other hand, is preferred for lower temperature drying of the glass.

The glass fibers to be treated with the sizing composition of the present invention can be produced according to methods well known to those skilled in the art. The glass fibers are produced by flowing molten glass via gravity through a multitude of small openings in a precious metal device called a bushing. After the fibers have cooled, very shortly after their issuance from the bushing and usually in close proximity to the bushing, the fibers are treated with the sizing composition. The size can generally be applied with sprayers, rollers, belts, metering devices or other similar application devices, although preferably the size is applied by roller. The sized fibers are gathered into bundles or strands comprising a plurality of individual fibers, generally from 200 to more than 3000. After their formation and treatment the strands are generally wound onto a spool or forming package and also may be chopped. The forming packages or chopped strands are usually dried either in an oven or at room temperature to remove some of the moisture from the fibers.

The glass compositions suitable for formation of the glass fibers can be any of the conventionally known materials such as soda lime glasses and borosilicate glasses like E glass and 621 type glass.

The glass fibers generally contain from about 0.01 weight percent to about 5 weight percent, preferably from about 0.5 weight percent to about 1.5 weight percent, of the moisture reduced residue of the sizing, on a loss on ignition basis.

The dried fibers are used to reinforce a variety of polymeric matrix materials such as those which have been detailed above, in any of the molding processes known to those skilled in the art utilizing either chopped strand, continuous strand or a mixture thereof. Preferably, the chopped fiber strands are mixed with the matrix polymer in a dry powder mixture to produce a homogeneous batch of matrix polymer. The batch can be for example, compression or injection molded to produce the fiber reinforced polymeric part or shaped device.

The following examples are illustrative of the invention and are not intended to be limiting.

EXAMPLES I AND II

These Examples illustrate the preparation of the two preferred aqueous sizing compositions for glass fibers according to the present invention. The sizing compositions were prepared from the following ingredients and formulated as described below.

| Ingredients | Weight Percent of Total Solids | |
|---|---|---|
| | I | II |
| A-1100 silane[1] | 16.1 | 11 |
| AQUACER 841[2] | 77.1 | — |
| CHEMCOR 43 C30[3] | — | 83.2 |
| KETJENLUBE 522[4] | 1.3 | 1.3 |
| AQUASTAB Brightener[5] | 0.5 | 0.5 |
| Sodium hypophosphite[6] | 5.0 | 4.0 |

[1]Gamma-aminopropyltriethoxysilane commercially available from Osi Specialties
[2]Aqueous emulsion of amorphous, carboxylated polypropylene polymer commercially available from Byk-Cera.
[3]Aqueous emulsion of amorphous, carboxylated polypropylene polymer commercially available from Chemical Corporation of America.
[4]Partial ester of branched carboxylic acid copolymer commercially available from Akzo. This same product has also been sold under the trademark DAPRAL GE 202.
[5]EASTOBRITE OB-1 bis(benzoxazole) fluorescent whitening agent commercially available from Eastman Chemical Company. This bis(benzoxazole) is supplied as an aqueous dispersion at 50 percent solids.
[6]Stabilizer which is commercially available from Fisher-Scientific.

The aqueous sizing composition of Example I was formulated in the following manner. To a main mix tank containing 500 liters of deionized water was added 8.6 kilograms of acetic acid (80 percent acetic acid) followed by 25.97 kilograms of the A-1100 amino silane and the mixture stirred for 10 minutes at a moderate rate. Then about 257.0 kilograms of the AQUACER 841 polypropylene emulsion were added to the main mix tank. The pH of the main mix tank was at about 5 prior to adding the emulsion.

To a premix tank containing 70 liters of deionized water at room temperature, 5.0 kilograms of sodium hypophosphite were added with stirring (about 10 minutes) until the sodium hypophosphite dissolved and the solution was added to the main mix tank.

To a premix tank containing 70 liters of deionized water at 70° C. was added 1.3 kilograms KETJENLUBE lubricant with stirring for about 10 minutes until the lubricant dissolved and this solution added to the main mix tank.

Finally, the aqueous dispersion of OB-1 fluorescent whitening agent (1.00 kilogram) was diluted with 70 liters of deionized water in a premix tank and this dilute mixture added to the main mix tank. The main mix tank was then diluted to a volume of 1000 liters. The aqueous sizing composition had a total solids of 10 percent and pH of 5.0.

The compositions of Examples II through X as well as the control and comparative examples were prepared in a similar manner although the specific ingredient amounts were different. Details of the compositions are set out in Tables 1 and 2.

The aqueous sizing composition was applied by roll applicator to a plurality of glass fibers prepared from an E-Glass composition to prepare strands having 800 filaments per strand where each of the filaments had a fiber diameter of 13 microns. The strands were wound on a forming package and processed by an "after dry wet chop method". That is, the strands were chopped to lengths of about ⅛ inch (32 millimeters) to about ½ inch (12.7 millimeters) and then dried in a fluidized bed hot air dryer.

For the control, Examples I, III to X and the comparative Examples, the chopped sized fibers were compounded in homopolymer polypropylene (commercially available from Himont as F-305 12 MF) and chemically coupled polypropylene (prepared by mixing 2.5 percent chemically coupled polypropylene commercially available from Exxon as Exxelor POX 1 1015 to the base homopolymer polypropylene). For Example II, the chopped sized fibers were compounded in homopolymer polypropylene commercially available from Himont as Profax 6525 and chemically coupled polypropylene (prepared by mixing 2.5 percent chemically coupled polypropylene commercially available from Uniroyal as Polybond 3002 to the base polymer polypropylene).

For the control, Example I, III to X and the comparative Examples, compounding was carried out by extruding the sized chopped glass fiber strands with pellets of the matrix polypropylene polymer in a Werner Pfleiderer ZSK 30 millimeter twin screw extruder at a screw speed of 300 rpm at full vacuum. The chopped strands were fed downstream using a vibratory glass strand feeder. Injection molding was performed with a Battenfeld CD750 machine at a screw speed of 100 rpm, clamp pressure of 100 bar and back pressure of 35 bar, using an ISO family mold. For Example II, compounding was carried out using a Werner Pfleider ZSK 40 twin screw extruder at a screw speed of 200 rpm at full vacuum. Injection molding was carried out using Stokes-Pennwalt Model 752-2 machine at a screw speed of 60 rpm, clamp pressure of 150 tons and back pressure of 65 psi using an ISO family mold.

The glass fiber reinforced composites using glass fibers sized with the aqueous sizing composition detailed above were tested for initial mechanical properties and color.

The composites were evaluated for color and initial mechanical properties in accordance with the following test methods:

Tensile Strength/Tensile Elongation: For the control, Example I, III to X and the comparative Examples, measured in MPa (megapascals) and % (percent), respectively, according to ISO 527 on a Zwick Model 1476 machine with the sample held by mechanical wedge grips. A 100 kilo newton load was used at a cross head speed of 2 millimeters/minute for measurement of the elongation and at 5 millimeters per minute for strength measurements. For Example II, tensile strength/elongation was measured in Mpa and percent, respectively, using an Instron Model 1125 according to ASTM D-638 at a crosshead speed of 0.2 inches per minute using a 1000 pound load.

Flexural Strength/Flexural Modulus: For the control, Example I, III to X and the comparative Examples, measured in MPa and GPa (gigapascals), respectively according to ISO 178 on a Zwick Model 1474 machine using a 3 kilo newton load with a three-point bending configuration and 64 millimeter span at a cross head speed of 2 millimeters per minute for measurement of modulus and 5 millimeters per minute for measurement of strength. For Example II, Flexural Strength and Flexural Modulus were measured in Mpa and Gpa, respectively, using an Instron Model 1123 according to ASTM D-790 at a crosshead speed of 0.1 inch per minute using a 100 pound load.

Impact:
1) Charpy: For the control, Example I, III to X and the comparative Examples, measured in kilojoules/square meter (KJ/m$^2$) using a Zwick pendulum type impact tester according to ISO 179.
2) Izod: Measured in KJ/m$^2$ using a Zwick pendulum type impact tester according to ISO 180. For Example II, both unnotched charpy and Izod was measured in Joules/meter (J/m) using a Tinius Olson Impact Pendulum tester according to ASTM D-256.

Glass Content: Determined by first weighing test specimens, burning them to remove any coating and then weighing them afterwards. The difference represents the glass content.

Color: For the control, Example I, III to X and the comparative Examples, measured using a Dr. Lange Colorimeter (For Example II using a Hunter Lab Colorimeter) as a function of color coordinates L, a and b. L is an indicia of whiteness with a larger number being indicative of improved whiteness whereas b is an indicia of yellowness with a smaller number being indicative of less yellowing. The a value corresponds to green and red, and for natural colored thermoplastics is usually between +0.5 and −1.5.

Tables 1 (homopolymer polypropylene) and 2 (chemically coupled polypropylene) tabulate data for color and initial mechanical properties of polymer composites reinforced with glass fibers sized with sizing compositions according to the present invention. (Example I through Example X) Also tabulated is data for a control and comparative examples. The control was a composite reinforced with glass fibers sized with a composition having all the ingredients of the preferred sizing composition detailed above in Example I except for the stabilizer and fluorescent whitening agent. The proportion of the remaining ingredients were adjusted to take into account the lack of stabilizer and whitening agent. Comparative examples 1, 2 and 3 were composites reinforced with glass fibers sized with compositions lacking either stabilizer or brightener.

Although the data for Example II has been included in Tables 1 and 2 for ease of presentation and comparison with the other Examples, as has been detailed above, Example II was compounded separately and tested slightly differently from the other Examples. The other Examples were prepared and tested together as a whole series.

TABLE 1

Homopolymer PP Himont F30 S12MF
Weight Percent Based on Total Solids

| | Control | Example I | Example II* | Example III | Example IV | Example V | Example VI | Example VII | Example VIII | Example IX | Example X | Comparative 1 | Comparative 2 | Comparative 3 |
|---|---|---|---|---|---|---|---|---|---|---|---|---|---|---|
| Ingredients | | | | | | | | | | | | | | |
| A-1100 | 21.1% | 16.1% | 11% | 19.3% | 19.4% | 4.0% | 8.1% | 12.0% | 12.0% | 8.1% | 8.1% | 20.6% | 20.0% | 81.1% |
| Aquacer 841 | 77.2% | 77.1% | 83.2% | 72.6% | 72.6% | 89.2% | 85.2% | 81.2% | 82.5% | 88.2% | 82.2% | 76.0% | 73.3% | 90.1% |
| Keijenlube 522 | 1.7% | 1.3% | 1.3% | 1.7% | 1.7% | 1.3% | 1.3% | 1.3% | | 1.3% | 1.3% | 1.8% | 1.7% | 1.3% |
| OB-1 Brightener | | 0.5% | 0.5% | 1.5% | 1.5% | 0.5% | 0.5% | 0.5% | 0.5% | 0.5% | 0.5% | 1.6% | | 0.5% |
| SP† | | 5.0% | 4.0% | 4.9% | | 5.0 | 5.0% | 5.0% | 5.1% | 2.0% | 8.0% | | 5.0% | |
| SBP†† | | | | | 4.9% | | | | | | | | | |
| Total Solids (%) | 100.0 | 100.0 | 100.0 | 100.0 | 100.1 | 100.0 | 100.0 | 100.0 | 100.1 | 100.0 | 100.0 | 100.0 | 99.9 | 100.0 |
| Properties | | | | | | | Data | | | | | | | |
| Tensile Strength (MPa) | 69 | 76 | 57 | 74 | 71 | 73 | 75 | 74 | 75 | 71 | 76 | 70 | 75 | 69 |
| Tensile Elongation (%) | 1.63% | 1.74% | 1.92% | 1.78% | 1.63% | 1.69% | 1.76% | 1.73% | 1.78% | 1.65% | 1.77% | 1.61% | 1.82% | 1.68% |
| Flexural Strength (MPa) | 92 | 103 | 82 | 94 | 94 | 95 | 103 | 99 | 104 | 96 | 103 | 94 | 103 | 92 |
| Flexural Modulus (GPa) | 5.4 | 5.6 | 5.0 | 5.5 | 5.5 | 5.5 | 5.6 | 5.4 | 5.6 | 5.6 | 5.5 | 5.6 | 5.5 | 5.5 |
| Unnotched Charpy (kJ/m2) | 9.9 | 11.8 | 235.5 (J/m) | 11.8 | 10.5 | 10.6 | 11.8 | 11.6 | 11.5 | 10.8 | 11.4 | 10.4 | 12.3 | 10.4 |
| Unnotched Izod (kJ/m2) | 18.8 | 20.5 | 68.6 (J/m) | 21.2 17.2 | 18.4 | 19.0 | 20.9 | 20.0 | 19.7 | 18.4 | 20.0 | 18.7 | 22.6 | 17.2 |
| Color | | | | | | | | | | | | | | |
| L | 58.7 | 59.1 | 71.2 | 59.9 | 61.8 | 59.7 | 58.7 | 58.8 | 59.0 | 60.2 | 58.5 | 59.8 | 58.5 | 60.8 |
| a | −2.5 | −0.5 | −3.2 | −0.5 | −1.6 | −0.7 | −0.8 | −0.7 | −1.0 | −0.5 | −0.8 | −0.4 | −1.7 | −1.3 |
| b | 5.6 | −2.3 | 8.4 | −4.2 | −1.2 | −2.7 | −2.4 | −2.4 | −2.6 | −0.5 | −3.0 | −1.4 | −1.4 | 1.3 |
| Glass Content % | 30.4 | 30.7 | 30.2 | 30.4 | 30.8 | 31.0 | 31.0 | 30.5 | 31.0 | 31.3 | 30.7 | 31.0 | 30.5 | 31.2 |

†Sodium hypophosphite
††Sodium benzene phosphinate
*As described herein, this Example was compounded and tested separately. The data is included here for convenience.

TABLE 2

Chemically Coupled PP 12MF Himont F305 + 2.5% Exxelor POXI 1015
Weight Percent Based on Total Solids

| | Control | Example I | Example II* | Example III | Example IV | Example V | Example VI | Example VII | Example VIII | Example IX | Example X | Comparative 1 | Comparative 2 | Comparative 3 |
|---|---|---|---|---|---|---|---|---|---|---|---|---|---|---|
| Ingredients | | | | | | | | | | | | | | |
| A-1100 | 21.1% | 16.1% | 11% | 19.3% | 19.4% | 4.0% | 8.1% | 12.0% | 12.0% | 8.1% | 8.1% | 20.6% | 20.0% | 8.1% |
| Aquacer 841 | 77.2% | 77.1% | 83.2% | 72.6% | 72.6% | 89.2% | 85.2% | 81.2% | 82.5% | 88.2% | 82.2% | 76.0% | 73.3% | 90.1% |
| Ketjenlube 522 | 1.7% | 1.3% | 1.3% | 1.7% | 1.7% | 1.3% | 1.3% | 1.3% | | 1.3% | 1.3% | 1.8% | 1.7% | 1.3% |
| OB-1 Brightener | | 0.5% | 0.5% | 1.5% | 1.5% | 0.5% | 0.5% | 0.5% | 0.5% | 0.5% | 0.5% | 1.6% | | 0.5% |
| SP† | | 5.0% | 4.0% | 4.9% | | 5.0 | 5.0% | 5.0% | 5.1% | 2.0% | 8.0% | | | |
| SBP†† | | | | | 4.9% | | | | | | | | 5.0% | |
| Total Solids (%) | 100.0 | 100.0 | 100.0 | 100.0 | 100.1 | 100.0 | 100.0 | 100.0 | 100.1 | 100.0 | 100.0 | 100.0 | 99.9 | 100.0 |
| Properties | | | | | | | | Data | | | | | | |
| Tensile Strength (MPa) | 102 | 102 | 72.3 | 101 | 101 | 85 | 94 | 94 | 100 | 95 | 97 | 103 | 100 | 93 |
| Tensile Elongation (%) | 3.24% | 3.01% | 3.60% | 3.13% | 3.02% | 1.99% | 2.38% | 2.76% | 2.76 | 2.35% | 2.57% | 3.11% | 2.46% | 2.28% |
| Flexural Strength (MPa) | 143 | 142 | 106.5 | 139 | 137 | 113 | 127 | 134 | 139 | 128 | 131 | 144 | 138 | 124 |
| Flexural Modulus (GPa) | 5.7 | 5.7 | 4.87 | 5.3 | 5.5 | 5.6 | 5.7 | 5.7 | 5.9 | 5.8 | 5.7 | 5.6 | 5.4 | 5.7 |
| Unnotched Charpy (kJ/m2) | 32.8 | 30.2 | 580.8 (J/m) | 31.9 | 29.0 | 14.5 | 20.8 | 26.3 | 25.7 | 19.7 | 23.3 | 32.2 | 31.3 | 19.1 |
| Unnotched Izod (kJ/m2) | 61.7 | 58.5 | 97.2 (J/m) | 61.5 | 58.4 | 28.5 | 40.6 | 51.6 | 51.6 | 38.7 | 48.0 | 60.6 | 59.0 | 37.5 |
| Color | | | | | | | | | | | | | | |
| L | 55.9 | 56.6 | 71.8 | 56.6 | 56.2 | 57.5 | 57.0 | 56.3 | 57.1 | 56.5 | 57.0 | 55.8 | 56.5 | 56.5 |
| a | −2.1 | −0.4 | −4.3 | −0.4 | −0.8 | −0.6 | −0.4 | −0.8 | −1.0 | −0.8 | −0.8 | −0.7 | −1.9 | −0.9 |
| b | 5.7 | −2.3 | 8.7 | −4.2 | −1.5 | −2.7 | −2.4 | −2.5 | −2.0 | −0.7 | −3.1 | −1.4 | 1.3 | 1.3 |
| Glass Content % | 31.1 | 31.2 | 29.7 | 30.8 | 30.4 | 31.0 | 31.0 | 30.9 | 31.6 | 31.4 | 31.1 | 30.5 | 30.6 | 31.3 |

†Sodium hypophosphite
††Sodium benzene phosphinate
*As described herein, the Example was compounded and tested spearately. The data is included here for convenience.

EXAMPLES XI TO XVIII

In these Examples, several other sizing compositions of the present invention were prepared. The preferred materials and proportions set forth in Example I were utilized throughout, except for the particular fluorescent whitening agent. Aqueous dispersions of the EASTOBRITE OB-3 and several of the UVITEX brighteners were utilized. These materials have been described in the specification and are commercially available from Eastman Chemical and Ciba Geigy, respectively. The control contained no fluorescent whitening agent. Since all of these Examples were prepared from the same master batch of sizing for completeness, a further Example utilizing AQUASTAB brightener was also included.

The glass fibers were formed, sized, compounded and evaluated according to the details of Example I, above. The data of evaluation are tabulated in Table 3 below.

of starch, film-forming polymers and mixtures thereof where the film-forming polymer is a thermoplastic or thermosetting polymer selected from the group consisting of polyurethanes, polyepoxides, polyolefins, vinyl polymers, polyesters, acrylic polymers and mixtures thereof.

4. The aqueous sizing composition of claim 1 wherein the fluorescent whitening agent is selected from the group consisting of stilbene derivatives; styryl derivatives of benzene; styryl derivatives of biphenyl; pyrazolines; bis(benzazol-1-yl) derivatives; bis(benzimidazol-2-yl) derivatives; 2-(benzofuran-2-yl) benzimidazoles; coumarins; carbostyrils; napthalimides; derivatives of dibenzothiophene-5, 5-dioxide; pyrene derivatives, pyridotriazoles and mixtures thereof.

5. The aqueous sizing composition of claim 1 wherein the coupling agent is selected from the group consisting of functional organo silanes, transition metal coupling agents, amino containing werner coupling agents, and mixtures thereof.

TABLE 3

| Fluorescent Whitening Agent | Color | | | Tensile Strength | Tensile Elongation | Flexural Strength | Flexural Modulus | Unnotched Charpy | Unnotched Izod | Glass Content |
|---|---|---|---|---|---|---|---|---|---|---|
| (0.05 wt. %) | L | a | b | (Mpa) | (%) | (MPa) | (Gpa) | (KJ/m2) | (KJ/m2) | % |
| Homopolymer PP Himont F30512 MF | | | | | | | | | | |
| Control (No FWA) | 57.72 | −2.38 | 5.08 | 75 | 1.76 | 97 | 5.2 | 12.7 | 21.5 | 31.7 |
| AQUASTAB (OB-1) | 58.96 | −1.19 | −0.44 | 69 | 1.62 | 92 | 5.2 | 11.8 | 20.5 | 31.2 |
| AQUASTAB (OB-3) | 57.75 | −1.12 | −1.49 | 74 | 1.71 | 93 | 4.7 | 13.2 | 22.7 | 30.4 |
| UVITEX OB | 58.38 | −1.68 | 0.88 | 78 | 1.72 | 102 | 5.1 | 13.0 | 22.7 | 31.9 |
| UVITEX FP | 57.96 | −1.12 | 0.25 | 75 | 1.74 | 97 | 5.0 | 13.0 | 21.5 | 30.8 |
| UVITEX EBF | 57.54 | −2.13 | 3.88 | 72 | 1.65 | 98 | 5.1 | 12.6 | 22.1 | 31.0 |
| UVITEX ERN | 57.33 | −2.22 | 3.44 | 76 | 1.69 | 103 | 5.3 | 14.0 | 24.6 | 31.7 |
| UVITEX TINOPAL SFP | 56.83 | −2.31 | 3.25 | 75 | 1.75 | 101 | 5.2 | 14.0 | 25.2 | 31.0 |
| Chemically Coupled PP 12 MF Himont F305 + 2.5% Exxelor POXI 1015 | | | | | | | | | | |
| Control (No FWA) | 55.35 | −2.21 | 6.35 | 101 | 3.16 | 146 | 5.8 | 33.9 | 63.2 | 31.9 |
| AQUASTAB (OB-1) | 56.00 | −0.98 | −0.51 | 100 | 2.68 | 141 | 5.7 | 28.3 | 57.0 | 31.9 |
| AQUASTAB (OB-3) | 56.17 | −0.90 | −1.52 | 100 | 2.88 | 138 | 5.7 | 30.1 | 58.6 | 31.8 |
| UVITEX OB | 55.75 | −1.49 | 0.42 | 99 | 2.97 | 142 | 5.7 | 31.8 | 57.4 | 31.4 |
| UVITEX FP | 55.75 | −1.08 | 0.30 | 100 | 2.90 | 139 | 5.7 | 29.7 | 58.6 | 31.5 |
| UVITEX EBF | 55.55 | −2.10 | 3.77 | | | | | | | |
| UVITEX ERN | 55.87 | −2.09 | 3.49 | 101 | 2.94 | 140 | 5.7 | 33.3 | 61.1 | 31.9 |
| UVITEX TINOPAL SFP | 55.67 | −2.29 | 3.54 | 101 | 2.90 | 139 | 5.6 | 32.5 | 59.3 | 31.6 |

I claim:

1. An aqueous sizing composition for glass fibers adapted to reinforce thermoplastic or thermosetting matrix polymers comprising:
   (a) a film forming material compatible with thermosetting or thermoplastic matrix polymers,
   (b) a fluorescent whitening agent which is at least dispersed emulsified or solubilized in water,
   (c) a coupling agent,
   (d) a stabilizing agent, and
   (e) a lubricant which is a partial ester of a branched carboxylic acid copolymer.

2. The aqueous sizing composition of claim 1, wherein the partial ester is present in an amount ranging from about 0.1 weight percent to about 5 weight percent, the percentages based on the total solids of the sizing composition.

3. The aqueous sizing composition of claim 1 wherein the film-forming material is selected from the group consisting 6. The aqueous sizing composition of claim 5 wherein the coupling agent is a functional organo silane.

7. The aqueous sizing composition of claim 6 wherein the functional organo silane is an aminofunctional organo silane.

8. The aqueous sizing composition of claim 1 wherein the stabilizing agent is a water dispersible, emulsifiable or soluble material which is selected from the group consisting of:

i) phosphinates selected from the group consisting of alkali metal phosphinates, alkaline earth metal phosphinates, ammonium phosphinate, organic phosphinates and mixtures thereof;

ii) phosphonites selected from the group consisting of alkali metal phosphonites, alkaline earth metal phosphonites, ammonium phosphonite, organic phosphonites and mixtures thereof;

iii) phosphites selected from the group consisting of alkali metal phosphites, alkaline earth metal phosphites, ammonium phosphite, organic phosphites and mixtures thereof;

iv) hypophosphites selected from the group consisting of alkali metal hypophosphites, alkaline earth metal hypophosphites, ammonium hypophosphite and mixtures thereof;

v) sulfites selected from the group consisting of alkali metal sulfites, alkaline earth metal sulfites, ammonium sulfite and mixtures thereof;

vi) bisulfites selected from the group consisting of alkali metal bisulfites, alkaline earth metal bisulfites, ammonium bisulfite and mixtures thereof; and vii) mixture of one or more of the stabilizers of i through vi with an antioxidant selected from the group consisting of hindered phenols, diarylamines, thioethers and mixtures thereof.

9. The aqueous sizing composition of claim 8 wherein the stabilizing agent is a hypophosphite selected from the group consisting of alkali metal hypophosphites and alkaline earth metal hypophosphites.

10. The aqueous sizing composition of claim 9 wherein the stabilizing agent is an alkali metal hypophosphite which is sodium hypophosphite.

11. The aqueous sizing composition of claim 3 wherein the film forming material is a polyolefin film forming polymer.

12. The aqueous sizing composition of claim 1 having a total solids content of from about 1 percent to about 30 percent.

13. The aqueous sizing composition of claim 1 wherein the fluorescent whitening agent is present in an amount of from about 0.05 weight percent to about 5.0 weight percent, the percentages based on the total solids of the sizing composition.

14. The aqueous sizing composition of claim 1 wherein the film forming material is present in an amount ranging from about 50 weight percent to about 98 weight percent, the percentages based on the total solids of the sizing composition.

15. The aqueous sizing composition of claim 1 wherein the stabilizer is present in an amount ranging from about 1 weight percent to about 25 weight percent, the percentages based on the total solids of the sizing composition.

16. The aqueous sizing composition of claim 1 wherein the coupling agent is present in an amount ranging from about 1 weight percent to about 30 weight percent, the percentages based on the total solids of the sizing composition.

17. The aqueous sizing composition of claim 1, wherein the partial ester is present in an amount ranging from about 0.1 weight percent to about 5 weight percent, the percentages based on the total solids of the sizing composition.

18. A plurality of glass fibers having applied on at least a portion of their surfaces the aqueous sizing composition of claim 1.

19. A glass fiber reinforced polymeric composite wherein the glass fiber reinforcement is a plurality of glass fibers of claim 18.

20. The composite of claim 19 wherein the polymeric matrix of the composite is a polyolefin.

* * * * *